3,177,163
RESIN PREPARED BY REACTING TANNIN-CONTAINING BARK WITH UREA AND FORMALDEHYDE
Charles Roland McCully, Prospect Heights, Ill., assignor, by mesne assignments, to C. Roland McCully, Prospect Heights, Ill.
No Drawing. Filed Jan. 10, 1961, Ser. No. 81,680
4 Claims. (Cl. 260—2.2)

The present invention relates broadly to soil conditioning, and is more particularly concerned with a method of preparing a soil builder by reacting tree bark in particulate form with urea and formaldehyde under certain specific reaction conditions.

It is known that the fertility of a soil is dependent upon a proper supply of nutrients being available at all times, and that the presence of excessive amounts of nutrients in an assimilable form may be as detrimental as insufficient amounts of nutritious substances. It is accordingly highly desirable that a mechanism be available in the soil for the storage of plant nutrients. Generally speaking, methods by which large amounts of these nutrients can be held in the soil without harm to plants are dependent on ion-exchange mechanisms and upon partial solubility, and the nutrients so held by the soil are then obtained by the plants through rather complicated mechanisms involving microbiological activity in the soil.

It is further important for satisfactory plant growth that the soil having the qualities of free penetration and drainage of water, as well as aeration. Thus, a deflocculated soil which exists in a puddled condition is not conducive to plant growth, and it is important that a soil under these conditions be treated with a conditioning agent which promotes the aggregation or granulation of the soil. Additionally, to properly supply the plants with the desired amount of water under varying soil moisture conditions, soil treatment compounds are at times required in order to widen the percentage range over which water can be retained in a form available to the plants.

In accordance with the principles of this invention, the moisture-holding and moisture-supplying capacities of soil and like media are markedly improved by treatment of the soil with an ion-exchange material prepared by reacting tree bark in particulate form with urea and formaldehyde under specific reaction conditions. In this connection, it is known that bark from trees contains more or less tannin depending upon the particular species. Tannins are, in general, a group of astringent, aromatic, acidic compounds found in various plants and trees, and particularly in the bark of trees. Tannins contain phenolic hydroxyl groups, and the tannin species of particular interest here is the so-called "cathechol" tannings which are known resin formers with formaldehyde. However, in the ordinary practice heretofore employed, the tannins are extracted from the bark and used in their substantially pure extracted form for reaction with formaldehyde, if it is desired to prepare a resin therefrom.

Quite in contrast, in the instant invention the resin-bearing material is prepared by employing the bark itself, or in other words, bark from which the tannins have not previously been extracted. The bark itself is of course composed primarily of cellulose which does not have appreciable ion-exchange properties, and the normal conclusion would be that the presence of excessive amounts of cellulose would subtract from, rather than add to, the ion-exchange properties of a tannin urea-formaldehyde resin. Whatever effect the bark would be expected to have, it is certain that one should expect only a diluting effect on the resin, and there would be no reason to assume that any improvement could be obtained. Just the opposite is true, however. Unique and important advantages in resin stability, improved ion-exchange, wash-resistance, and other properties have resulted from practice of this invention.

It is accordingly an important aim of the present invention to provide an improved resin-bearing material.

Another object of this invention lies in the provision of an improved ion-exchange resin-bearing material obtained from inexpensive sources and possessing improved properties for use in soil conditioning.

Still another object of the instant invention is to provide a method producing an improved soil builder in which there is heated an admixture of moist bark in particulate form and urea, aqueous formaldehyde with sufficient acid added thereto, and the resulting mixture rapidly heated from substantially room temperature to at least 75° C. to complete resin formation in the bark.

A further object of this invention lies in the provision of a method of soil conditioning in which there is admixed with or spread upon the soil a resin-bearing material prepared by the foregoing noted co-condensation of tannin with urea and formaldehyde.

Other objects and advantages of the invention will become more apparent as the description now proceeds.

The superiority of the resin-bearing material of this invention as a soil conditioning agent is believed to arise first from the presence of a semi-permanent nitrogen supply provided by the urea, and second, from the rapid heating of the bark in the presence of resin forming formaldehyde. As a result of the rapid heating step, an initial uniform distribution of the tannin within the bark is obtained, without excessive leaching of the tannin out of the bark and into aqueous solution, whereupon it would be converted to insoluble resin that is not attached to the bark and would be lost for purposes of the instant invention.

While other theories may exist, it is believed that the formaldehyde serves to form a permeable film around the bark particles which resists to some extent the extraction or leaching of tannin by the warm water solution, but does not prevent the redistribution of tannin within the bark particles and the subsequent resinification thereof by formaldehyde penetration of the bark particles, catalyzed by the acid.

A general idea of the complexity of the phenomena here involved may be appreciated when one considers that the bark comprises cellulose fibers. The surface area of cellulose fibers is immense. The fibers are understood to comprise elongated interwoven fibrils about 1.4 microns thick; the fibrils are bundles of interwoven ultrafibrils which are 0.1–0.3 micron thick; the ultrafibrils are in turn composed of micells also assumed to be interwoven along slender threads; and the micells may be pictured as ropes comprising 100 to 150 cellulose molecular chains arranged in a crystal lattice. The micells are understood to have a diameter of about 60 to 70 Angstrom units and a length of at least 600 Angstrom units. The space between the cellulose molecular chains is very small, sometimes as small as 10 to 15 Angstrom units, and the problem of moving tanning molecules or resin molecules is thus greatly complicated. Moreover, the cellulose chains contain hydroxyl groups which may be chemically activated under certain conditions.

In bark, the problem is further complicated because the general uniformity of cellulose structure possessed in the wood portion of a tree is not present in bark and a substantial number of other ingredients such as tannins, lignins, etc. are present in the bark in various forms. It is believed that one of the important features of the instant invention is based upon a discovery of the necessity for redistributing the tannin in the bark before accomplishing actual resinification. Such redistribution of the tannin is accomplished preferably without any leaching of the tannin out of the bark and into solution in the aqueous environment.

It will also be appreciated that barks containing extremely high concentrations of tannins are not particularly well adapted for use in the instant invention, because definite use of the cellulose content of the bark is contemplated as a carrier providing the immense surface necessary in adequate ion-exchange materials. In general, the barks used in the practice of the instant invention may have tannin contents ranging from a minimum effective amount of about 1% to a maximum amount of about 20%, above which the beneficial effects of the cellulose present appear to be materially reduced. Although barks such as the bark of Douglas fir, pine trees, etc. containing around 7% tannins may be used in the practice of the instant invention, it has been found generally that a minimum of about 10% (catechol) tannins by weight should be present in the bark if it is to obtain the most advantageous results in the practice of the instant invention. A maximum of about 15% tannins is also preferred; and the best results in the practice of the invention are obtained using hemlock bark (about 12–14% tannins).

The bark is preferably ground down to approximately sawdust size or to a relatively fine particulate form in order to facilitate carrying out the reaction and certain considerations are involved with respect to the actual physical character of the bark. In other words, if the bark has been dried, it will be appreciated that it will take longer for the tannin to be redistributed therein. On the other hand, if the bark has been washed considerably the tannin content may be lower and more rapid heating may be desired to minimize further tannin loss. In general, the reaction conditions described hereinafter are preferred for use with substantially untreated or undried bark that has merely been removed from the logs and ground into particulate form. The bark is referred to in the proportions hereinafter given on a dry weight basis.

As a first step in the instant process, the bark is either mixed with crystalline urea and water added thereto, or a slurry of water and bark formed to which crystalline urea is then added. It is important to prevent leaching of the tannin out of the bark, such as would occur if the bark was soaked with urea solution before adding formaldehyde, and accordingly, the preferred procedure is is to add crystalline urea to moist bark followed by heating the bark-urea slurry until the urea has been adsorbed. In this connection, and for soil conditioning applications, the amount of urea in parts by weight based on the parts by weight of tannin may vary from 1 to 5 to 1 to 50, and the optimum range is 1 to 10 to 1 to 20. As used herein, the terms "parts" and "percent" mean parts and percent by weight unless otherwise designated.

Subsequent to heating the bark-urea slurry, which may be accomplished by use of oven heat at approximately 130° F. for about one hour, there is added aqueous formaldehyde and sufficient acid catalyst, followed by rapid heating. The amount of formaldehyde in parts by weight based on the parts by weight of tannin may vary from 5 to 1 to 1 to 20, for soil conditioning applications, and the optimum range is 1 to 1 to 1 to 10. The aqueous formaldehyde used may have concentrations ranging from a practical minimum of about 1% to a practical maximum of about 40%.

Rapid heating is one of the keys to the instant invention, because it is desired to effect a redistribution of the tannin only within the bark structure itself, and not a leaching of the tannin out of the bark structure with the heated aqueous medium surrounding the bark. As will be appreciated, the water has the simplest molecules present and it can thus penetrate the cellulose structure most rapidly, causing swelling of the fibrous material and softening or dissolving of the tannins. The formaldehyde also tends to penetrate the fibrous material rapidly because of its simple formula, except that the formaldehyde reacts with the urea-condensed tannin upon contacting the same and forms a resinous membrane which tends to resist (at least temporarily) flow of dissolved tannin outwardly from the bark into the aqueous solution. By rapid heating of the bark-urea-formaldehyde slurry at a rate of at least about 2° C. per minute, it is possible to effect the desired redistribution of tannin within the bark without extracting an appreciable amount of tannin from the bark. The rate of heating should not exceed about 10° C. per minute, or the tannin may not have sufficient time to be redistributed in the bark, before the accelerated resinification process will have prevented further travel of the tannin within the bark.

The rapid heating is carried out from substantially room temperature to at least about 75° C. and preferably to at least about 85–95° C. As indicated, the acid catalyst may be combined with the aqueous formaldehyde prior to addition to the bark-urea slurry, or the aqueous formaldehyde may be first added to the slurry and sufficient acid added during the rapid heating step to lower the pH from its original value of about 5–8 to a pH of at least as low as 1. Heating is then continued to complete the resin formation in the bark. As will be appreciated, the formaldehyde reacts comparatively slowly with the urea-condensed tannin in the absence of the acid catalyst, but the reaction is greatly accelerated when the aqueous formaldehyde is acidified to as low a pH as 1. Any strongly acidic acid may be used to carry out the acidification process, such as hydrochloric acid, sulfuric acid, phosphoric acid, etc., but hydrochloric acid is preferred and it is added preferably in amounts ranging from 0.5 to 10% of the weight of the bark present in the slurry. Thorough mixing is carried out during the acidification process to eliminate localized heating in the slurry, and the temperature of the slurry is maintained at least at 75–95° C. for a minimum of an additional five to ten minutes, and preferably for as much as thirty minutes in order to complete the resin formation in the bark.

Next the reacted bark is separated from the aqueous solution by suitable draining or filtration and washed, after which alkali such as ammonium hydroxide may be added to raise the pH to about 9, the product obtained may be dried prior to use as an ion-exchange resin.

In carrying out the initial heating operation, it will be appreciated that heating can be carried to temperatures as high as perhaps 130° C., if a pressure reaction vessel is employed, but in the practice of the instant invention it is preferably not to require the use of pressure and, accordingly, initial heating is carried out most preferably to just about the boiling point of the aqueous medium, or about 95° C.

The ion-exchange capacity of the thus reacted bark may be greatly increased, however, by carrying out a subsequent sulfiting reaction which involves heating the resulting material (the reacted bark) in particulate form with an aqueous sulfite solution. The sulfite used may be any sulfite salt but is preferably an alkali metal bisulfite such as sodium bisulfite. For example, the resulting bark is admixed with 1 to 10 times its weight of 5 to 40% sodium bisulfite aqueous solution and the resulting slurry is heated at 90 to 100° C. (and to as high as 130° C. if a pressure vessel is used) for from 15 minutes to an hour depending upon the temperature and sulfite concentration until the sulfiting reaction is completed and the product is then washed and dried.

Another aspect of the instant invention resides in the discovery of certain advantages which can be obtained by hot pressing the bark particles (preferably before rather than after sulfiting) after resin formation has been completed. In other words, after heating the urea-condensed bark and aqueous formaldehyde to approximately 95° C. and addition of the acid to complete resin formation in the bark, the bark particles may next be hot pressed to effect curing of the resin therein. This curing is conversion of the resin to a thermoset resin, as contrasted to the generally thermoplastic resin that results from acidification at approximately 100° C. In carrying out the hot pressing operation pressures in the range from 1000 to 10,000 pounds per square inch may be used at temperatures of 130° C. to 150° C. (for holding times of from several minutes up to 20 minutes). Resulting hot pressed material is, in effect, molded material since it is subjected to the normal hot pressing molding operation for thermosetting resins. The material is then broken up again into finely divided particulate material, again of approximately sawdust size such as that hereinbefore described, and this material may then be reacted with the sulfite using the reaction conditions hereinbefore described in order to obtain a sulfited resin having extremely high ion-exchange capacity.

Specific examples of the invention may be used to demonstrate the same. For example, in a first demonstration 60 grams of hemlock bark is mixed with five grams of crystalline urea, and to this mixture 50 grams of water is added to provide a bark-urea slurry. This slurry is then heated in oven for one hour at 130° F., and after removal from the oven, the intermediate product is then mixed into a solution comprised of 150 ml. of water, 5 ml. hydrochloric acid (36%), and 20 ml. of formaldehyde (36%). The mixture is heated rapidly from room temperature (i.e. about 40° C.) to approximately 95° C. (in twenty minutes), followed by draining and washing and drying. It is found that the product obtained has a satisfactory high ion-exchange capacity.

As an alternative, in a second demonstration the rapidly heated co-condensed bark was drained and washed and then admixed with four parts per part of dry bark of a 5% aqueous sodium bisulfite solution and heated in a pressure reactor at 130° C. for 30 minutes. The bark was then drained and washed and dried, and a superior ion-exchange material was obtained.

If, instead of the foregoing procedure, the bark is hot pressed at 140° C. and 4000 lbs. per square inch for 20 minutes and then broken down into particles again, before the sulfiting reaction is carried out, and the same sulfiting reaction conditions are employed then, it is found that even greater ion-exchange capacity is obtained in the resin. Moreover, it is found that the bark which has been subjected to the hot pressing step (followed by sulfiting) has superior resistance to attrition and washing and has superior resistance to general deterioration (which might be caused by decay of the fibrous cellulose component, if hot pressing is not carried).

It will also be noted that the foregoing procedure may be altered by adding the hydrochloric acid at the time the aqueous formaldehyde solution is added to the bark, followed by rapid heating at a rate of at least 2° C. per minute. For example, by heating rapidly from room temperature to about 95° C. at a rate of 3° C. per minute using this procedure it is possible to obtain ion-exchange properties which are about 30% poorer than those obtained adding the acid after the temperature of 95° C. has been reached. Nevertheless, the ion-exchange properties are better in many respects than those obtained heretofore and this is primarily a result of the rapid heating which prevents loss of the tannin, even though the early addition of the acid may tend to cause premature resin formation in the bark before the optimum distribution of tannin can be accomplished.

As another demonstration, 1500 grams of dry bark is admixed with 1500 grams of water and 150 grams of urea. The slurry is placed in an oven for one hour at 130° F., and thereafter 3000 grams of water having in solution therewith 600 ml. of formaldehyde and 150 ml. of hydrochloric acid is added. The mixture is rapidly heated from room temperature to 95° C. (in about twenty minutes), and the product obtained washed with boiling water for about twenty minutes to a pH of about 3. To raise the pH to the desired level for soil builder applications, there is then added approximately 90 ml. of sodium hydroxide, after which the resulting bark is drained. It is found that the bark product has extremely good ion-exchange properties. In addition, the bark product may be hot pressed and/or sulfited using the procedure just described in order to obtain improved ion-exchange capacity. In this connection, hemlock bark is the preferred starting material, although Douglas fir bark or pine tree bark may be employed, however, a lower ion-exchange capacity is obtained with the latter two materials. As well, oak, chestnut, redwood, etc. barks may also be used, although again hemlock bark has proved to be the most satisfactory to date.

The hot pressing operation is a conventional operation for thermosetting mold materials and the sulfiting reaction is a conventional sulfiting reaction, although these particular reactions in each case bring about distinct improvements in the practice of the instant invention using bark prepared as described herein.

The amount of resin-bearing material prepared by the instant method and admixed with the soil to be conditioned varies from a minimum of about 0.1% by weight of the soil to a maximum of about 10% by weight, while an optimum amount is from 1 to 2% based on the weight of soil. The resin or processed bark is combined with the tillable soil layer to a depth of about three inches, although the depth of penetration may be as high as six inches with good results. A processed bark as herein produced for soil builder applications has been found to have an ion-exchange capacity of 45–50 milli-equivalents per 100 grams when using Douglas fir and hemlock barks, and this compares with an exchange capacity of 10–20 milli-equivalents for a good soil, and about 2–4 milli-equivalents per 100 grams for a very sandy soil.

A series of tests have been conducted which demonstrate the superior soil building properties of the resin-bearing material of this invention, as compared with untreated bark and with fertilized soil not containing the instant agent. Generally, as compared with the control not containing either untreated bark or the instant soil builder, the growth rates for the instant conditioning agent were approximately 40% greater, while the growth rates were about 100 to 200% greater as compared with fertilized soil having admixed therewith untreated bark. The latter would appear to reflect the effect of nitrogen depletion caused by bacterial action on the untreated bark. It was observed that the present soil conditioning agent increases the moisture holding capacity of clay soil, and imparts to said soil a porous granular structure so that acceptance of moisture is more rapid.

A further important advantage of the co-condensed product of this invention is that there is provided an available or semi-permanent nitrogen supply by the initial condensation of tannin with urea. This nitrogen supply is particularly advantageous for those applications in which growth must be sustained over extended periods, and in which a single fertilization is not feasible. In other words, by a first condensation with urea, the resulting end product has not only soil building properties in that it aids in the formation of soil aggregates in the sandy soil, improves the physical condition of clay soil, and greatly stimulates root growth in both sandy and clay soils, but additionally, has fertilization characteristics.

It will be understood that modifications and variations may be effected without departing from the spirit and scope of the novel concepts of the present invention.

I claim as my invention:

1. A method of preparing a resin-bearing material which comprises admixing a moist tannin containing bark in particulate form with crystalline urea, heating the resulting mixture until the urea is adsorbed by the bark, adding aqueous formaldehyde to the resulting urea-treated mixture, and acidifying the mixture at least to pH 1 with rapid heating up to at least 75° C. at a rate between 2° and 10° C. per minute to effect resin formation in the bark.

2. The method of claim 1 in which the bark being treated has a tannin content of from 1 to 20%.

3. The method of claim 1 in which said formaldehyde is added in an amount of from 1/20 to 5 times the amount of tannin present.

4. A method of preparing a resin-bearing material which comprises admixing a moist tannin containing bark in particulate form with crystalline urea, heating the resulting mixture until the urea is adsorbed by the bark, adding aqueous formaldehyde to the resulting urea-treated mixture, acidifying the mixture at least to pH 1 with rapid heating up to at least 75° C. at a rate between 2° and 10° C. per minute to effect resin formation in the bark, and thereafter hot pressing the resultant bark particles to cure the resin therein.

References Cited by the Examiner

UNITED STATES PATENTS

| | | | |
|---|---|---|---|
| 2,094,359 | 9/37 | Kirkpatrick | 260—2.2 |
| 2,150,164 | 3/39 | Heath et al. | 71—23 |
| 2,266,265 | 12/41 | Rieche et al. | 260—2.2 |
| 2,381,205 | 8/45 | Caughey | 260—17.3 |
| 2,562,898 | 8/51 | Evans et al. | 260—17.3 |
| 2,714,553 | 8/55 | Bibb et al. | 71—23 |
| 2,773,847 | 12/56 | Pauley | 260—17.2 |
| 2,789,098 | 4/57 | Collinson | 260—17.3 |
| 2,926,146 | 2/60 | McCully | 260—17.2 |

LEON J. BERCOVITZ, *Primary Examiner.*

M. A. BRINDISI, JAMES A. SEIDLECK, *Examiners.*